United States Patent [19]

Garrett et al.

[11] 4,311,216
[45] Jan. 19, 1982

[54] TORQUE PLATE FOR DISC BRAKE

[75] Inventors: Wayne H. Garrett, Troy; Ted Zbikowski, Southfield, both of Mich.

[73] Assignee: Eaton Corporation, Cleveland, Ohio

[21] Appl. No.: 82,357

[22] Filed: Oct. 5, 1979

[51] Int. Cl.³ .............................................. F16D 65/02
[52] U.S. Cl. ................... 188/18 A; 188/71.1; 188/73.43
[58] Field of Search ................... 188/71.1, 73.3, 18 A, 188/71.6, 72.7, 264 A, 264 AA

[56] References Cited

U.S. PATENT DOCUMENTS

| | | | |
|---|---|---|---|
| 3,243,016 | 3/1966 | Swift | 188/72.7 |
| 3,907,081 | 9/1975 | Smith et al. | 188/73.3 |
| 4,005,768 | 2/1977 | Bubnash et al. | 188/264 AA |
| 4,047,598 | 9/1977 | Thrower | 188/71.1 |
| 4,154,321 | 5/1979 | Falk | 188/72.7 |

Primary Examiner—Edward R. Kazenske
Attorney, Agent, or Firm—R. J. McCloskey; D. L. Wood

[57] ABSTRACT

A vehicular disc brake of the floating caliper type wherein the torque plate 14 mounting the caliper 13 includes an annular base 50 which is cut out to provide a slot 72, diametrically opposed radially extending arm portions 52 and 54, and caliper mounting portions 56 and 58 extending axially from the free outer ends of the arm portions. The torque plate is mounted on the axle assembly 12 of the related vehicle by utilizing the slot in the base portion to slip the torque plate over the axle assembly at a reduced diameter location thereon inboard of the axle flange 46 and thereafter sliding it axially outboard on the axle assembly to seat the outboard face 82, of the base portion against the inboard face of the flange.

3 Claims, 3 Drawing Figures

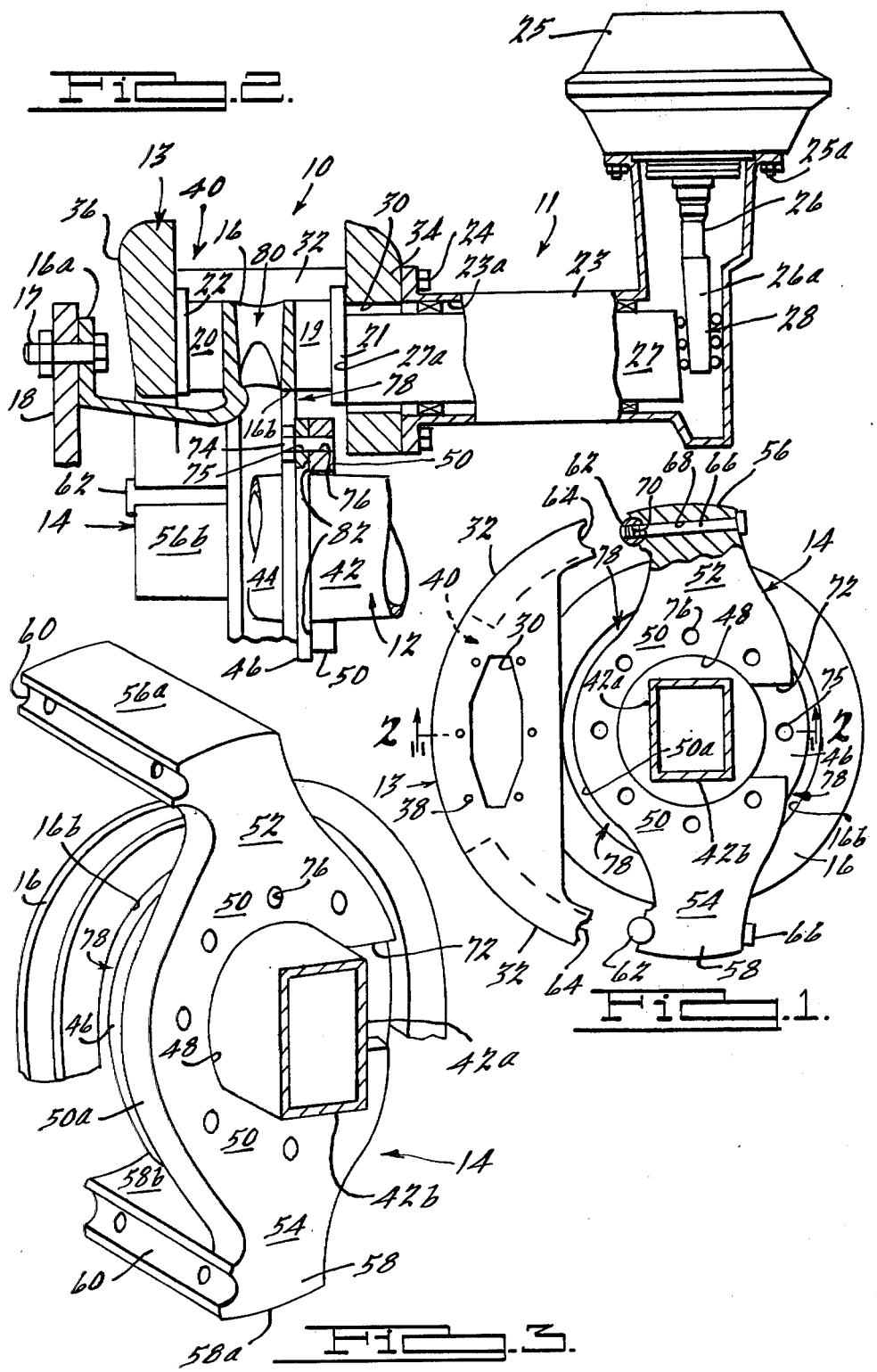

TORQUE PLATE FOR DISC BRAKE

BACKGROUND OF THE INVENTION

This invention relates to vehicular disc brakes of the sliding caliper type and, more particularly, to a novel torque plate for use with a sliding caliper disc brake.

In a typical sliding caliper disc brake, the caliper embraces the rotor and is slidably supported at its opposite ends by a torque plate fixedly secured to a nonrotating portion of the axle assembly of the associated vehicle. As the brake is applied by the actuator assembly, the brake pad driven directly by the actuator assembly, typically the inboard pad, is pressed against the inboard face of the rotor, whereafter, with continued driving input from the actuator assembly, the caliper slides inboard on the torque plate to bring the outboard pad, carried by the caliper, into frictional engagement with the outboard face of the rotor. The torque plate is a critical element in this combination. In addition to allowing smooth sliding movement of the caliper on the torque plate, the torque plate, particularly in heavy-duty applications, must efficiently absorb large magnitudes of braking torque and transmit this torque efficiently to the fixed vehicle assembly, typically the axle housing. The torque plate must also be configured and installed in such a manner as to not significantly interfere with the flow of cooling air over the rotor. Prior art torque plates have either sacrificed brake cooling effectiveness to maximize torque absorbing capacity, or have limited torque absorbing capacity to maximize brake cooling efficiency.

SUMMARY OF THE INVENTION

Accordingly, it is an object of the present invention to provide an improved torque plate for a disc brake assembly.

It is a more specific object to provide a torque plate for a heavy-duty disc brake assembly that provides excellent torque absorbing and transmitting capabilities and also provides excellent rotor cooling.

The torque plate of the invention is adapted for use in a disc brake of the type including a rotor, a caliper embracing the rotor, and a torque plate carrying the caliper and adapted to be secured to a flange of a related axle assembly. According to an important feature of the invention, the torque plate includes a generally annular base portion; arm portions extending radially outwardly from the base portion at circumferentially spaced locations thereon; mounting portions extending axially from the radially outer ends of the arm portions; and guide means along one axial edge of each mounting portion. In the assembled position of the torque plate, a generally annular mounting surface on the outboard face of the base portion seats against the inboard face of the axle flange; the arm portions extend radially outwardly to a location beyond the outer diameter of the rotor; the mounting portions extend axially outboard over the rotor; and the guide means on the mounting portions slidably mount the caliper. This arrangement provides a large area interface between the torque plate and the axle flange, whereby to maximize the torque transmitting and absorbing characteristics of the brake assembly, and further provides a large area substantially continuous annular air gap between the torque plate base portion and the inner diameter of the rotor, whereby to maximize cooling of the rotor and optimize the braking performance of the rotor.

According to another feature of the invention, the base portion includes a cut out to allow the torque plate to be slipped over the axle assembly at a location thereon inboard of the axle flange, whereby to position the outboard face of the base portion against the inboard face of the flange. This arrangement provides the rotor cooling advantages inherent in the inboard mounting of the torque plate while retaining a large area interface between the torque plate and the axle flange.

According to a further feature of the invention, the cut out in the base portion has a width substantially less than the inner diameter of the base portion and the torque plate is installed by slipping it over a reduced diameter portion of the axle assembly inboard of the flange and thereafter sliding it axially outboard to its installed position against the inboard face of the flange. This arrangement increases the interface area between the torque plate and the axle flange while continuing to maximize rotor cooling.

These and other objects, features and advantages of the invention will become apparent from the following detailed description of a preferred embodiment of the invention and from the accompanying drawings.

BRIEF DESCRIPTION OF THE DRAWINGS

FIG. 1 is a partially exploded view of a motor vehicle rear axle assembly embodying the disc brake assembly of the present invention but with the brake actuator removed for purposes of clarity;

FIG. 2 is a cross sectional view taken on Line 2—2 of FIG. 1 but with the actuator shown; and FIG. 3 is a prospective fragmentary view of the invention disc brake assembly with the caliper and actuator removed.

DESCRIPTION OF THE PREFERRED EMBODIMENT

The invention vehicle brake assembly, broadly considered, includes a caliper disc brake assembly 10, an associated actuator assembly 11, and an associated axle housing assembly 12.

Caliper disc brake assembly 10 includes a caliper 13, a torque plate 14 secured to axle housing assembly 12 and slidably mounting caliper 13, a rotor 16 embraced by caliper 13 and having a flange portion 16a secured as by bolts 17 to a wheel 18 of an associated vehicle, and inboard and outboard brake pads 19 and 20 having backing plates 21 and 22.

Actuator assembly 11 may take various forms. As disclosed, assembly 11 includes a generally L-shaped housing 23 secured at one end by bolts 24 to the inboard face of caliper 13, an air motor 25 secured to the other end of housing 23 by bolts 25a, a wedge actuator member 26 driven by the air motor, and a tappet 27 driven by a wedge portion 26a of actuator member 26 through a roller bearing assembly 28. The free end 27a of tappet 27 extends through opening 23a in housing 23 and through an opening 30 in caliper 14 to act against backing plate 21 of inboard brake pad 19 to press pad 19 against the inboard face of rotor 16 and thereafter slide the caliper inboard, or to the right as viewed in FIG. 2, to in turn apply outboard pad 20, carried by the caliper, against the outboard face of rotor 16, whereby to brake wheel 18 of the associated vehicle, all in known manner.

Caliper 13 may also take various forms. As disclosed, caliper 13 is formed as a unitary ferrous casting. Caliper 13, in transverse cross section, has a C-shaped configuration and includes an arcuate central (or back) portion 32, and inboard and outboard web portions 34 and 36. Outboard web portion 36 has a smaller radial dimension than inboard portion 34 to facilitate clearance of rotor 16, and inboard web portion 34 defines oblong opening 30 passing tappet 27. A plurality of bolt holes 38 spaced around opening 30 receive bolts 24 securing actuator assembly 11 to caliper 13. Caliper 13 is of the "open back" type, i.e., the "back" portion 32 of the caliper is "open", as at 40, so that pads 19 and 20 together with backing plates 21 and 22 may be removed for replacement without removing caliper 13, simply by removing a pair of bolts (not shown) which pass through outboard caliper web portion 36 and through suitable holes in backing plates 21 and 22 for threaded engagement with threaded throughbores in inboard caliper web portion 34. As is typical of "open back" caliper designs, the caliper of the invention has a considerable arcuate extent as compared to "closed back" designs. As shown, caliper 13 has an arcuate extent, as scribed from the axle centerline, of approximately 130 degrees.

Axle housing assembly 12 includes an inboard housing portion 42, an outboard housing portion 44, and an annular radially extending flange 46 adjacent the interface of portions 42 and 44. A plurality of holes 75 are provided in flange 46 at circumferentially spaced locations thereabout.

The present invention relates particularly to torque plate 14. Torque plate 14 is formed as a unitary ferrous casting and includes a central aperture or opening 48 forming the inner periphery of a generally annular base portion 50; two arm portions 52 and 54 extending radially outwardly from base portion 50 at diametrically opposed locations thereon; and two mounting portions 56 and 58 extending axially outboard from the radially outer ends of arm portions 52 and 54. A groove 60 is formed in one axial edge of each mounting portion. Grooves 60 receive guide pins 62 and guide pins 62 are slidably received in grooves 64 formed at the opposite ends of caliper 13. Pins 62 are releasably held in grooves 60 by bolts 66 passing through bores 68 in mounting portions 56, 58 for engagement with threaded throughbores 70 in pins 62. Further details of the structure and operation of the described guide pin arrangement are shown in U.S. patent application Ser. No. 974,186 filed Dec. 26, 1978 and assigned to the assignee of the present application.

The outer periphery 50a of base portion 50 lies on a circle centered on the centerline of aperture 48. The diameter of base portion 50 corresponds generally to the diameter of flange 46 of axle housing assembly 12 and both of these diameters are significantly less than the diameter of the inner periphery 16b of rotor 16. An annular mounting surface 82 is provided on the outboard face of annular base portion 50 and a plurality of circumferentially spaced tapped mounting holes 76 pass through base portion 50 and open in mounting surface 82. The radially outer and inner surfaces 56a, 56b, and 58a, 58b of mounting portions 56, 58 comprise arcuate surfaces centered on the centerline of aperture 48. A cut out or slot 72 in base portion 50, midway between arm portions 52, 54, facilitates mounting of the torque plate on the axle housing assembly. Cutout 72 is centered on a diameter of base portion 50 and has a width that is significantly less than the inner diameter of base portion 50.

In the disclosed embodiment, the inboard portion 42 of axle housing assembly 12 is circular in cross section adjacent flange 46 and has a diameter slightly less than the diameter of central aperture 48 of base portion 50 of torque plate 14. As inboard axle portion 42 extends inboard from flange 46, it necks down and assumes a rectangular cross section with the major dimension 42a of the rectangle extending in the vertical direction and the minor dimension 42b extending in the horizontal direction. Cut out 72 in base portion 50 is slightly larger in width than minor dimension 42b.

In the assembly of the invention disc brake, torque plate 14 is slipped over axle housing section 42 at the necked down, rectangular cross section portion thereof with the torque plate turned ninety degrees from its position of FIG. 1 to allow cutout 72 to pass minor dimension 42b, whereafter torque plate 14 is rotated to its position of FIG. 1 and then slid axially outboard on axle housing portion 42 to seat annular mounting surface 82 against the inboard face of flange 46. Mounting bolts 74 are then passed through holes 75 for engagement with threaded bores 76 in torque plate 14, whereby to securely fix torque plate 14 to the inboard face of flange 46. Wheel 18, with rotor 16 secured thereto, is then mounted on the outboard end of the axle assembly in known manner. Lower guide pin 62 is then fixed in lower torque plate groove 60 by bolts 66, whereafter the lower groove 64 of caliper 13 (with actuator assembly 11 attached) is seated on lower pin 62 and upper pin 62 is placed in upper caliper groove 64. The caliper and actuator assembly are thereafter rotated upwardly to seat upper pin 64 in upper torque plate groove 60, whereafter upper bolts 66 are threaded into bores 70 in upper pin 60 to secure the upper pin to the torque plate and slidably mount the caliper assembly on the torque plate.

In the installed configuration of the various brake assembly elements, an annular gap 78 of significant radial extent is provided between the outer periphery of flange 46 and torque plate base portion 50 and the inner periphery 16b of rotor 16. Although annular gap 78 is partially blocked by torque plate arms 52 and 54 and by inner web 34 of caliper 13, it still provides a large area, substantially continuous annular path for cooling air to enter from the inboard side of the brake assembly for subsequent radially outward passage through the vented central portion 80 of rotor 16. Gap 78 and vented rotor portion 80 thus combine to pass a substantial quantity of cooling air over the rotor whereby to maximize cooling of the rotor and optimize the braking performance of the rotor. Further, and equally important, the annular base portion with its minimized cut out dimension maximizes the area of the interface between the torque plate and the axle flange to thereby maximize the torque absorbing and transmitting capacity of the brake. For example, in the embodiment shown, seven of the eight bolt holes in the axle flange actually receive bolts so that the torque transmitting capacity of the torque plate approximates that of a full annular construction.

Although a preferred embodiment of the invention has been illustrated and described in detail, it will be understood that various changes may be made in the disclosed embodiment without departing from the scope or spirit of the invention.

What is claimed is:

1. A sliding caliper disc brake assembly for a heavy duty motor vehicle comprising:

(A) a rear axle housing including a tubular inboard housing portion, a tubular outboard housing portion, and an annular radially extending flange adjacent to the interface of said portions and having a generally circular outer diameter; said inboard axle housing portion being necked down at a location thereon spaced inboard from said flange to provide a reduced dimension cross section;

(B) a vented disc brake rotor positioned concentrically with respect to said axle housing with the generally circular inner diameter of the rotor spaced radially outwardly from the outer diameter of said flange to provide an annular gap therebetween;

(C) a caliper embracing said rotor; and (D) a torque plate including:
 (1) a generally annular base portion positioned concentrically on said inboard housing section with its outboard face secured to the inboard face of said flange and having a generally circular outer diameter approximating that of said flange;
 (2) means defining a cutout in said base portion having a dimension approximating said reduced dimension so that the torque plate may be slipped over said inboard axle housing portion at said reduced dimension cross section and then slid axially outboard to its installed position seated against the inboard face of said flange;
 (3) arm portions extending radially outwardly from said base portion at circumferentially spaced locations thereon and across said gap to a location radially beyond the outer diameter of said rotor, and
 (4) mounting portions extending axially outboard from the radially outer ends of said arm portions and over said rotor to provide mounting and guide means for said caliper and to allow the caliper to slide on the torque plate as the brake is applied.

2. A brake assembly according to claim 1 wherein
(E) said arm portions are two in number and are generally diametrically opposed.

3. A brake assembly according to claim 2 wherein
(F) said base portion cut out is provided at a location thereon generally midway between arm portions.

* * * * *